(12) United States Patent
Beale et al.

(10) Patent No.: US 11,382,082 B2
(45) Date of Patent: Jul. 5, 2022

(54) WIRELESS TELECOMMUNICATIONS

(71) Applicant: SONY CORPORATION, Tokyo (JP)

(72) Inventors: Martin Warwick Beale, Basingstoke (GB); Shin Horng Wong, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 3 days.

(21) Appl. No.: 15/751,502

(22) PCT Filed: Aug. 22, 2016

(86) PCT No.: PCT/EP2016/069825
§ 371 (c)(1),
(2) Date: Feb. 9, 2018

(87) PCT Pub. No.: WO2017/050499
PCT Pub. Date: Mar. 30, 2017

(65) Prior Publication Data
US 2018/0234953 A1 Aug. 16, 2018

(30) Foreign Application Priority Data
Sep. 25, 2015 (EP) ..................................... 15186989

(51) Int. Cl.
*H04W 72/04* (2009.01)
*H04L 5/00* (2006.01)
*H04W 72/14* (2009.01)

(52) U.S. Cl.
CPC ......... *H04W 72/042* (2013.01); *H04L 5/0053* (2013.01); *H04L 5/0055* (2013.01); *H04L 5/0094* (2013.01); *H04W 72/14* (2013.01)

(58) Field of Classification Search
CPC .. H04W 72/042; H04W 72/04; H04L 5/0055; H04L 1/16; H04L 1/18
See application file for complete search history.

(56) References Cited

U.S. PATENT DOCUMENTS 8,169,953 B2 * 5/2012 Damnjanovic ...... H04B 7/2615
370/329
8,306,573 B2 * 11/2012 Elmaleh ................ H04W 48/10
370/329

(Continued)

FOREIGN PATENT DOCUMENTS

CN 103026650 A 4/2013
CN 103532690 A 1/2014

(Continued)

OTHER PUBLICATIONS

International Search Report dated Oct. 26, 2016 in PCT/EP2016/069825 filed Aug. 22, 2016.

*Primary Examiner* — Kibrom T Hailu
(74) *Attorney, Agent, or Firm* — Xsensus LLP

(57) ABSTRACT

A terminal device for use in a wireless telecommunications system includes: a transceiver configured to perform wireless communication with a base station using a communications resource allocated to the terminal device by the base station; and a controller configured to: control the transceiver to receive a grant signal from the base station, the grant signal specifying a communications resource for use by the terminal device; control the transceiver to send a wireless message to the base station using the communications resource specified by the grant signal; determine, in dependence upon the grant signal, a subset, being some but not all, of a set of control data elements providing wireless signalling from the base station to the terminal device; and detect, from a control data element in the subset, acknowledgement information sent by the base station in respect of the wireless message.

16 Claims, 12 Drawing Sheets

(56) References Cited

U.S. PATENT DOCUMENTS

| | | | |
|---|---|---|---|
| 9,253,758 B2* | 2/2016 | Trainin | H04W 72/0446 |
| 10,219,267 B2* | 2/2019 | Suzuki | H04H 20/30 |
| 2008/0232307 A1 | 9/2008 | Pi et al. | |
| 2012/0134305 A1* | 5/2012 | Damnjanovic | H04L 1/1607 |
| | | | 370/280 |
| 2012/0157108 A1* | 6/2012 | Boudreau | H04W 16/32 |
| | | | 455/450 |
| 2012/0300722 A1 | 11/2012 | Kim et al. | |
| 2013/0083746 A1 | 4/2013 | Nazar et al. | |
| 2013/0083750 A1 | 4/2013 | Nazar et al. | |
| 2013/0083753 A1* | 4/2013 | Lee | H04W 72/0453 |
| | | | 370/329 |
| 2014/0307697 A1* | 10/2014 | Beale | H04L 5/0044 |
| | | | 370/329 |
| 2014/0355451 A1* | 12/2014 | Kim | H04L 1/0026 |
| | | | 370/241 |
| 2015/0078224 A1* | 3/2015 | Xiong | H04L 1/1887 |
| | | | 370/280 |
| 2015/0085782 A1* | 3/2015 | Seo | H04L 1/1854 |
| | | | 370/329 |
| 2016/0128055 A1* | 5/2016 | Xiong | H04W 72/048 |
| | | | 370/329 |
| 2017/0187494 A1* | 6/2017 | Tirronen | H04L 1/189 |
| 2017/0223725 A1* | 8/2017 | Xiong | H04W 72/042 |
| 2018/0084561 A1* | 3/2018 | Liu | H04W 72/042 |
| 2018/0103459 A1* | 4/2018 | Liu | H04L 1/0038 |
| 2018/0212736 A1* | 7/2018 | Chatterjee | H04L 5/0094 |
| 2018/0249440 A1* | 8/2018 | Zhang | H04W 76/45 |

FOREIGN PATENT DOCUMENTS

| | | |
|---|---|---|
| EP | 2675227 A1 | 12/2013 |
| WO | 2017/029066 A1 | 2/2017 |

* cited by examiner

WIRELESS TELECOMMUNICATIONS

CROSS-REFERENCE TO RELATED APPLICATIONS

The present application is based on PCT filing PCT/EP2016/069825 filed Aug. 22, 2016, and claims priority to European Patent Application 15 186 989.8, filed in the European Patent Office on Sep. 25, 2015, the entire contents of each of which being incorporated herein by reference.

BACKGROUND

Field

This disclosure relates to wireless telecommunications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

Low Complexity MTC (Machine Type Communication) UE (user equipment) (LC-MTC) has been proposed, for example in the 3GPP ($3^{rd}$ Generation Partnership Project). Features of LC-MTC UE include low complexity, potential for low cost, coverage enhancement and potential for reduced power consumption.

A technique to reduce complexity and cost for LC-MTC UE is to restrict the UE to operate within 6 PRBs (Physical Resource Blocks). The system bandwidth is therefore divided into multiple 6 PRB narrowbands and the LC-MTC UE is expected to be able to tune into any of these narrowbands.

In the coverage enhancement (CE) feature, the coverage for LC-MTC is extended by 15 dB (decibels) relative to that of a so-called Cat-1 UE. The main technique for CE is via numerous repetitions of the same message, with the received versions being combined in order to improve the signal to noise ratio of the combination as compared to that of any individual instance of the message. Numerous repetition of the same message can decrease the spectral efficiency. Therefore, for operation in CE mode, multiple coverage enhancement levels (CE levels) or repetition levels are introduced such that the appropriate number of repetitions is used at each CE level.

However, this use of different repetition levels can lead to increased power usage, which can be a potential problem for terminal devices such as LC-MTC type devices.

SUMMARY

The present disclosure can address or mitigates the problems discussed above.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
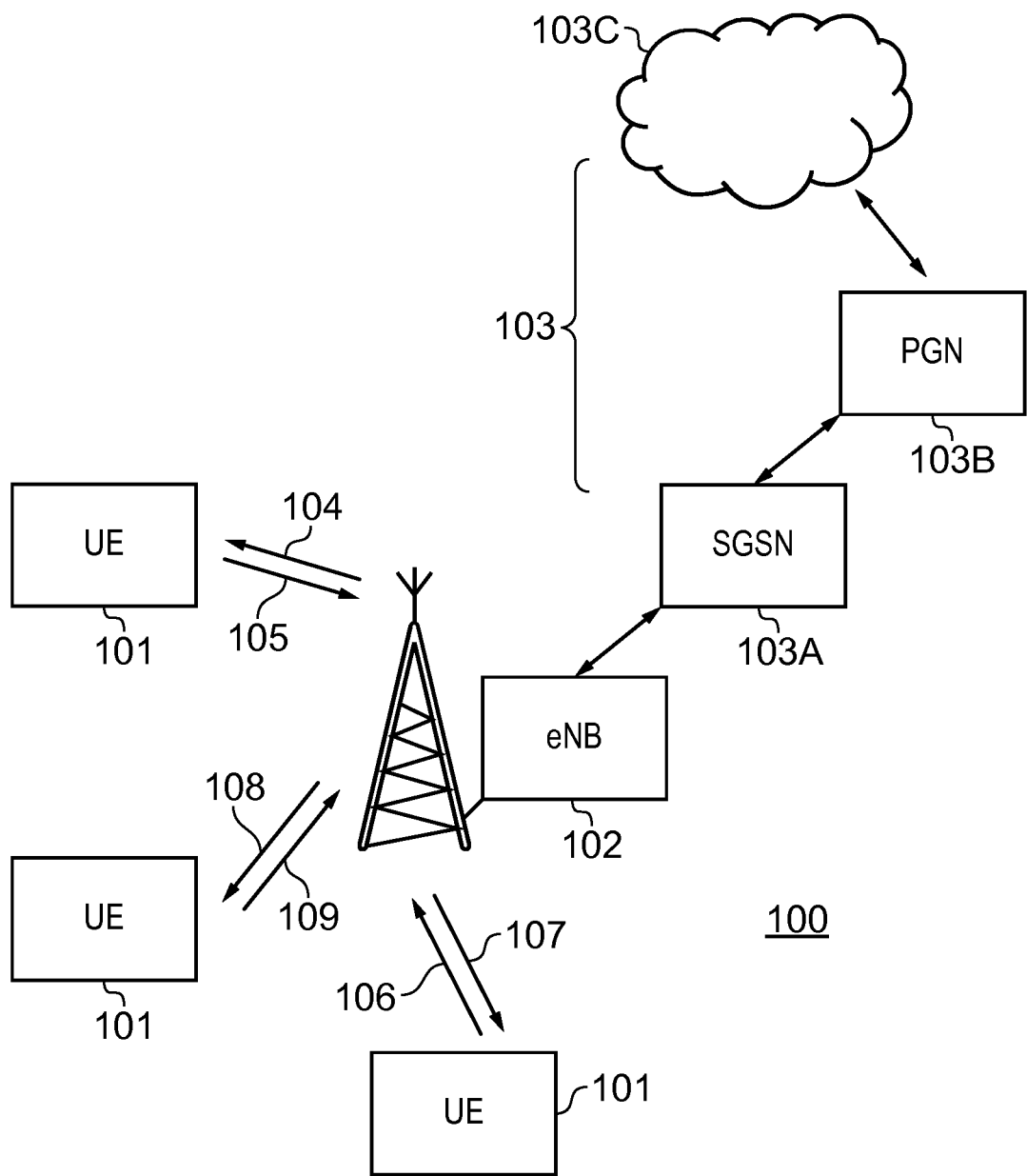
FIG. 1 schematically illustrates a mobile telecommunications system.

FIG. 1 provides a schematic diagram of a mobile telecommunications system 100, where the system includes mobile communications terminals (such as UEs) 101, infrastructure equipment 102 and a core network 103.

The infrastructure equipment may also be referred to as a base station, network element, enhanced Node B (eNodeB or eNB) or a coordinating entity for example, and provides a wireless access interface to the one or more communications terminals within a coverage area or cell. The one or more mobile communications terminals may communicate data via the transmission and reception of signals representing data using the wireless access interface. The infrastructure equipment 102 is communicatively linked to core network components such as a serving gateway support node (SGSN) 103A, a packet gateway node 103B and an external network 103C, which may be connected to one or more other communications systems or networks which have a similar structure to that formed from communications terminals 101 and infrastructure equipment 102.

The core network 103 may also provide functionality including authentication, mobility management, charging and so on for the communications terminals served by the network entity. The mobile communications terminals 101 of FIG. 1 may also be referred to as communications terminals, user equipment (UE), terminal devices and so forth, and are configured to communicate with one or more other communications terminals served by the same or a different coverage area via the infrastructure equipment. These communications may be performed by transmitting and receiving signals representing data using the wireless access interface over the two way communications links represented by lines 104 to 109, where 104, 106 and 108 represent downlink communications from the infrastructure equipment to the communications terminals and 105, 107 and 109 represent uplink communications from the communications terminals to the infrastructure equipment. The telecommunications system 100 may operate in accordance with a telecommunications protocol. For instance in some examples the system 100 may generally operate in accordance with a 3GPP Long Term Evolution (LTE) standard where the network entity and communications terminals are commonly referred to as eNodeB and UEs, respectively.

A brief description of the LTE wireless access interface is explained in the following paragraphs with reference to FIGS. 2 and 3 to support the explanation of the example embodiments of the present technique which are provided in the following paragraphs.

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 2 and 3.

Figure 2:
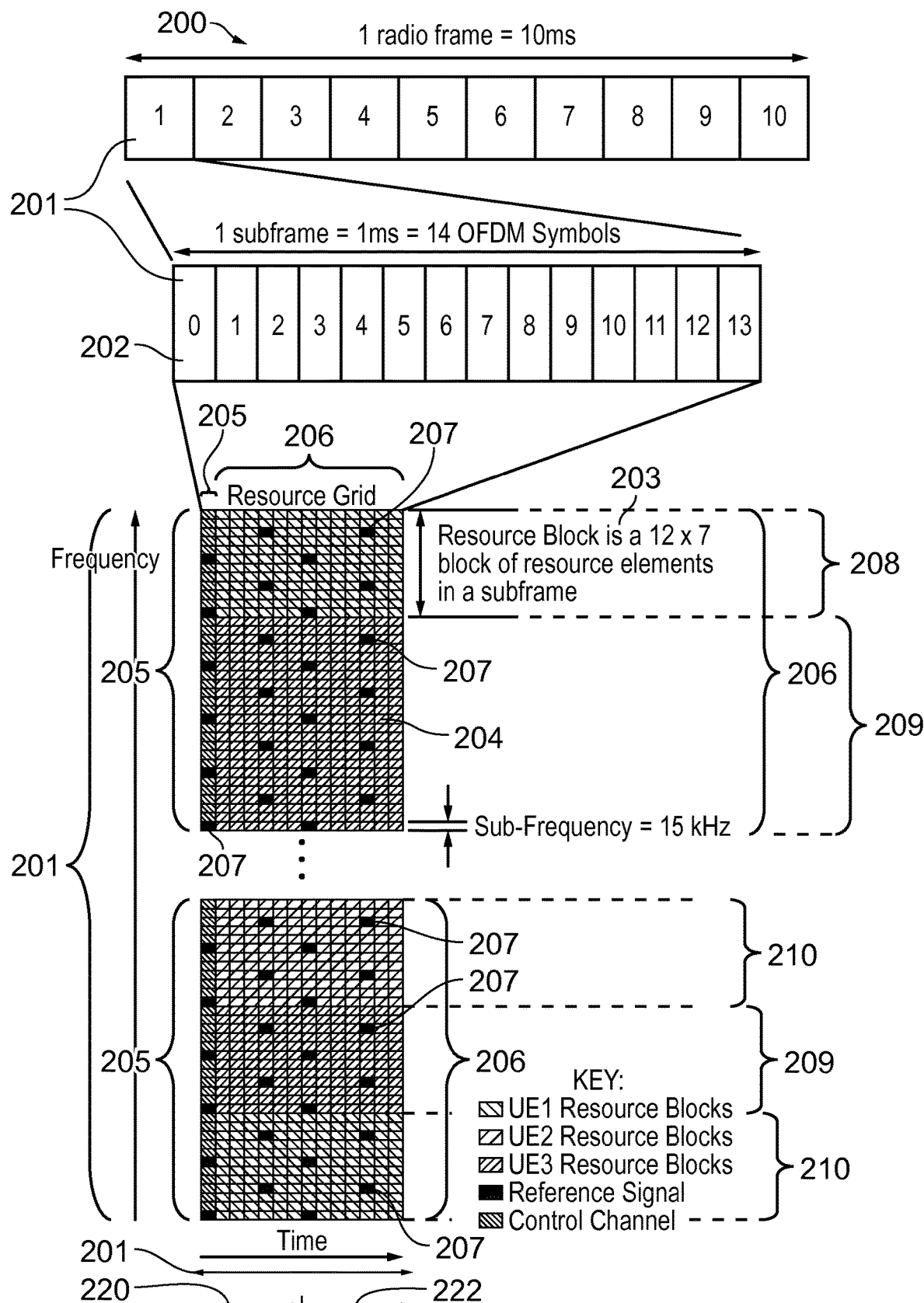
FIG. 2 provides a simplified schematic diagram of the structure of a downlink of a wireless access interface.

FIG. 2 provides a simplified schematic diagram of the structure of a downlink of a wireless access interface that may be provided by or in association with the base station of FIG. 1 when the communications system is operating in accordance with the LTE standard. In LTE systems the wireless access interface of the downlink from a base station to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used for features such as the cyclic prefix of the OFDM symbols). The number of subcarriers varies between 72 subcarriers (1.4 MHz) and 1200 subcarriers (20 MHz). In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz. As shown in FIG. 2, the resources of the wireless access interface are also temporally divided into frames where a frame 200 lasts 10 ms and is subdivided into 10 subframes 201 each with a duration of 1 ms. Each subframe 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. However of particular relevance in understanding the example embodiments of the present technique are the downlink control channel referred to as the physical downlink control channel (PDCCH) and a shared channel of resources for transmitting data to UEs which is the physical downlink shared channel (PDSCH).

Figure 3:
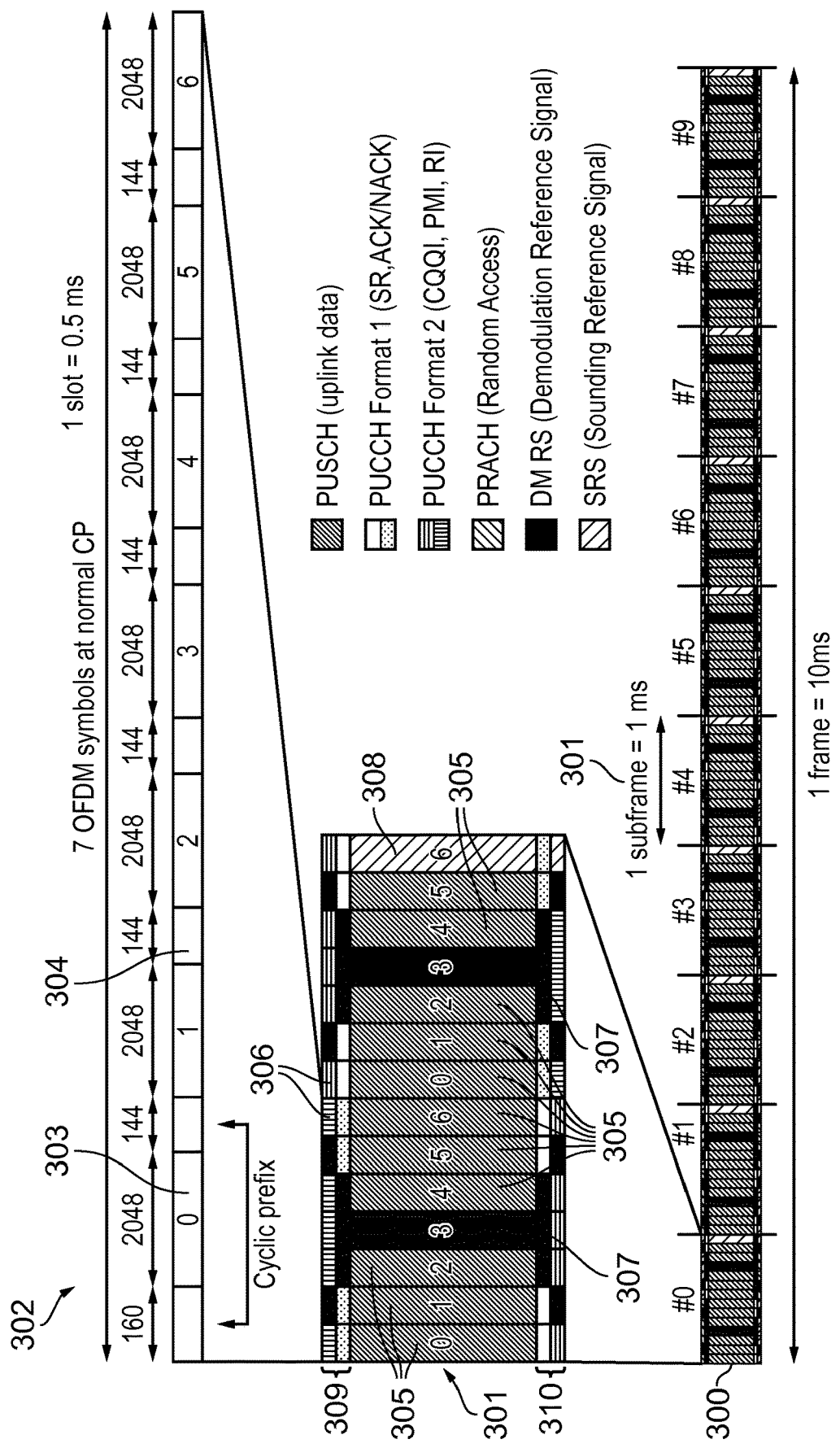
FIG. 3 provides a simplified schematic diagram of the structure of an uplink of a wireless access interface.

FIG. 3 provides a simplified schematic diagram of the structure of an uplink of an LTE wireless access interface that may be provided by or in association with the base station of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes.

The LTE data or datagram is transmitted on the PDSCH on the downlink and on the PUSCH in the uplink. The resources on the PDSCH and the PUSCH are allocated to the terminal device by the base station.

Figure 4:
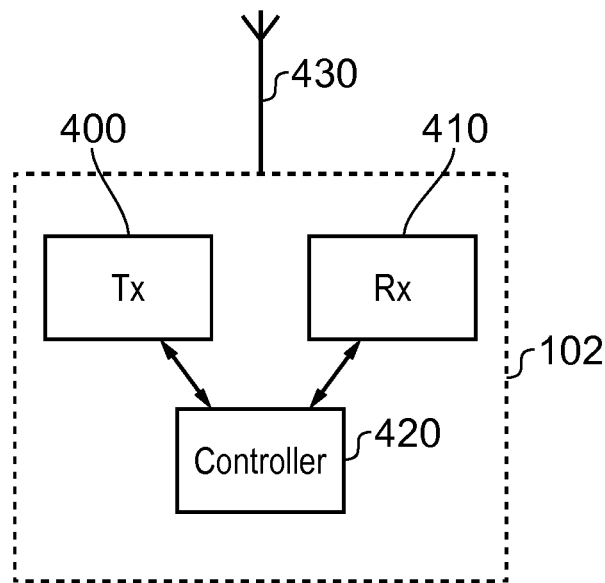
FIG. 4 schematically illustrates a base station.

FIG. 4 schematically illustrates a base station 102 in more detail. The base station 102 includes a transmitter (Tx) 400 for transmitting signals via a wireless access interface (and via an antenna 430) to the one or more communications devices or UEs, and a receiver (Rx) 410 to receive signals from the one or more UEs within the coverage area of the base station. The transmitter and receiver collectively form a transceiver. A controller 420 controls the transmitter 400 and the receiver 410 to transmit and receive the signals via the wireless access interface. The controller 420 may perform a function of controlling the allocation of communications resource elements of the wireless access interface and may in some examples include a scheduler for scheduling transmissions via the wireless access interface for both an uplink and the downlink. Operations of a base station discussed in connection with the description below may be undertaken or overseen, at least in part, by the controller 420.

Figure 5:
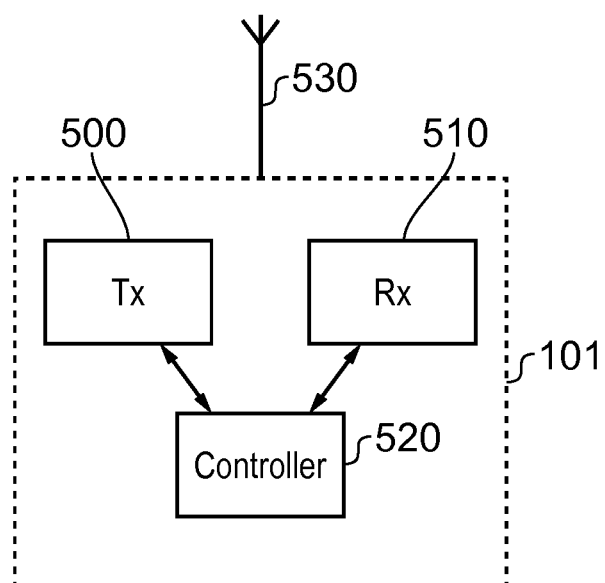
FIG. 5 schematically illustrates a user equipment (UE)

FIG. 5 schematically illustrates a UE 101 in more detail. The UE 101 includes a transmitter 500 associated with an antenna 530 for transmitting signals on the uplink of the wireless access interface to the base station 102 and a receiver 510 for receiving signals transmitted by the base station 102 on the downlink via the wireless access interface. The transmitter and receiver collectively form a transceiver. The transmitter 500 and the receiver 510 are controlled by a controller 520. Operations of a UE discussed in connection with the description below may be undertaken or overseen, at least in part, by the controller 520. In example embodiments of the present disclosure, the UE 101 is a so-called Low Complexity Machine Type Communication (LC-MTC) terminal device.

The UE of FIG. 5 is therefore an example of a terminal device for use in a wireless telecommunications system having a transceiver 500, 510 configured to perform wireless communication with a base station using a communications resource allocated to the terminal device by the base station; and a controller 520 configured to: control the transceiver to receive a grant signal from the base station, the grant signal specifying a communications resource for use by the terminal device; and control the transceiver to send a wireless message to the base station using the communications resource specified by the grant signal.

Figure 6:
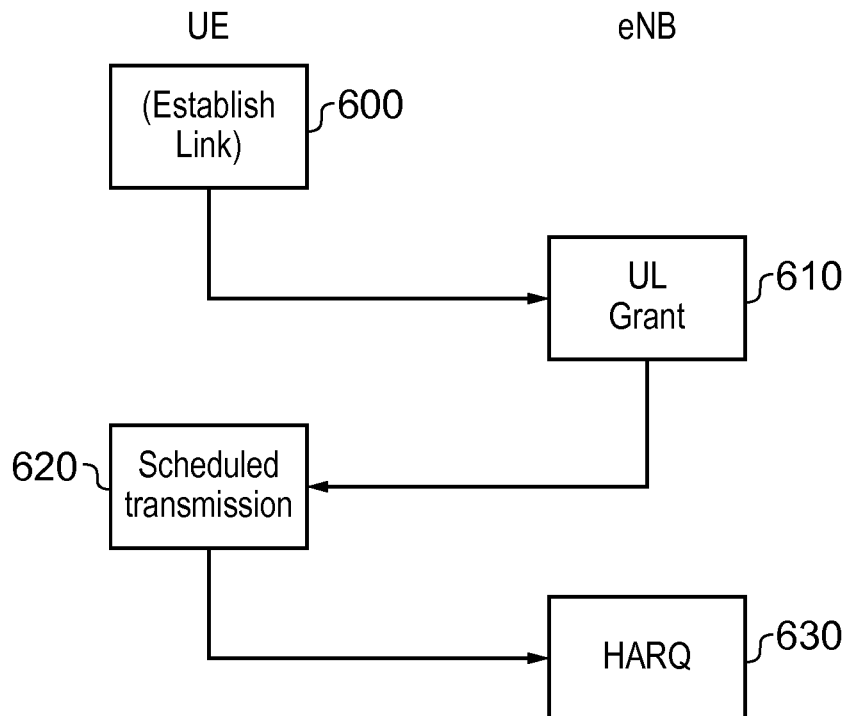
FIG. 6 is a schematic flowchart showing an uplink transmission procedure.

FIG. 6 is a schematic diagram showing an uplink transmission procedure, for example as part of a network-initiated call to an LC-MTC terminal device (such as a UE).

A step 600 is included as a summary of procedures up to this point in the process, for example being initiated by a paging message from the base station, in response to which the UE and base station undergo multiple interactions such as those defined by an RRC (radio resource control) protocol, culminating in the base station (such as an eNB) issuing an Uplink (UL) Grant to the UE to schedule the use of PUSCH (Physical Uplink Shared Channel) resource. The Uplink Grant is sent as at least part of a DCI (downlink control information) message, where the DCI is carried by an MPDCCH (or in other examples by an EPDCCH or PDCCH), where PDCCH stands for physical downlink control channel. The examples discussed here relate to MPDCCHs, but similar considerations may apply to EPDCCHs.

The uplink grant can define a communications resource comprising one or both of a radio frequency band and a transmission time slot. It may include a DCI to schedule the grant signal.

Figure 7:
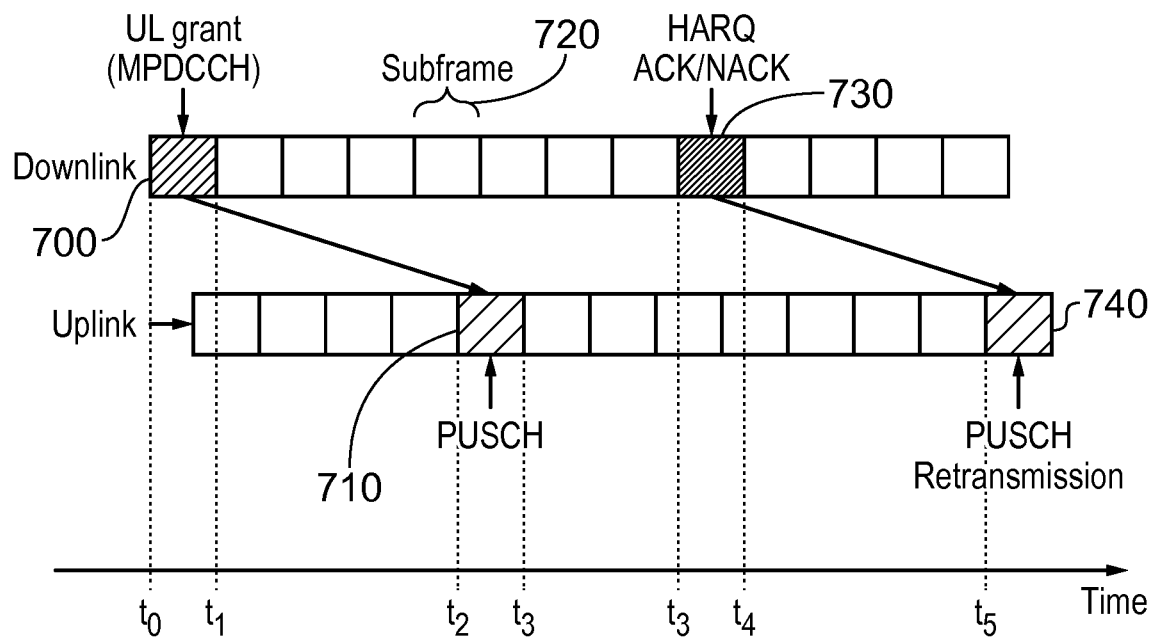
FIG. 7 is a schematic timing diagram relating to a scheduled transmission and hybrid automatic repeat request (HARQ) procedure.

The PUSCH transmission is transmitted using a synchronous HARQ (hybrid automatic repeat request) transmission as shown in FIG. 7, where the timing differences between the uplink grant, the PUSCH and the HARQ ACK/NACK (acknowledgement/negative acknowledgement) are predetermined (in this example, a four subframe offset is used in each case).

An EPDCCH consists of one or more ECCEs (Enhanced Control Channel Element), where an MPDCCH can carry an entire DCI. The number of ECCEs in an EPDCCH corresponds to the AL (Aggregation Level) of that EPDCCH, which determines the amount of physical resource (number of resource elements) applied to the EPDCCH. For example if the AL=4, it means that the EPDCCH contains 4 ECCEs and the coding rate applied to the DCI is 4 times lower (i.e. more robust) than the coding rate applied to the DCI if the AL were AL=1.

An EPDCCH search space consists of multiple EPDCCH candidates (for example, carried by respective PRBs, or across groups of PRBs, or as multiple EPDCCHs in a single PRB) where an EPDCCH candidate is defined by its AL and the location (e.g. starting location) of its ECCE(s) within the search space. In general terms, the terminal device may "blind decode" for the EPDCCH in the search space, which is to say, it will test each MPDCCH candidate until it detects one with an EPDCCH intended for that UE. (Note that this implies a serial process; the process does not have to be serial, but if a serial process is used (for example in low complexity terminal devices) it can be arranged to stop when a successful detection is reached). In some examples, the EPDCCH has a cyclic redundancy code or other error detecting code (CRC) which is masked by (or combined with) an identifier (ID) such as the terminal device's C-RNTI and "detection of an EPDCCH" is determined when the CRC (that is masked with the ID) check passes. In LC-MTC, the DCI is carried by an MPDCCH. The design of the MPDCCH (where the "M" is currently understood to stand for "Machine") is based on that of the EPDCCH. An MPDCCH candidate, in addition to having an AL and a starting ECCE, also has a Repetition Level, RL, for operation in a coverage enhancement (CE) mode. In a coverage enhancement mode, the MPDCCH is repeated over a plurality of subframes so as to allow an LC-MTC UE to determine the control information carried by the MPDCCH even in a poor coverage area. The MDPCCH comprising the DCI is an example of control information which schedules downlink radio resources for radio transmission from a base station to a terminal device and/or uplink radio resources for radio transmission from a terminal device to a base station. It has been agreed in 3GPP that the radio resources scheduled by the control information of the MPDCCH for channel PDSCH (downlink) and/or PUSCH (uplink) would start at a known offset after the end of the MPDCCH transmission. That is if MPDCCH ends in subframe n, the PDSCH (or PUSCH) would start in subframe n+k, where k is a known offset.

With reference to FIG. 6, the UL grant (700, FIG. 7) is sent by the base station at a step 610. The UE makes a scheduled transmission (PUSCH, 710 in FIG. 7) at a step 620, four subframes 720 later. Then, at a step 630, the base station sends a HARQ response 730, including either an acknowledgement or a negative acknowledgement. The PUSCH may be retransmitted (740) if the HARQ response included a NACK.

Uplink HARQ (hybrid automatic repeat request) acknowledgements/negative acknowledgements (ACK/NACK) are transmitted to the terminal device by the base station. In non-adaptive HARQ, the base station sends only a ACK or NACK, and if it is a NACK, the terminal device would reuse the same PUSCH resource as that in the first transmission, for the retransmission. In adaptive HARQ, the base station can schedule the terminal device to use different PUSCH resource for the retransmission, which provides flexibility for the base station.

In 3GPP the HARQ ACK/NACK is transmitted using a DCI in the MPDCCH for both non-adaptive HARQ and adaptive HARQ. It is expected that only non-adaptive HARQ is used in a typical CE operation. Since HARQ ACK/NACK is carried by the MPDCCH, the LC-MTC UE would use energy in performing blind decoding of it. Hence, it is considered to be potentially beneficial to reduce the need for such blind decoding.

In summary of FIG. 6, the step 610 provides an example of the transmission of a grant signal from the base station to the terminal device (and its reception by the terminal device), the grant signal specifying a communications resource for use by the terminal device. The step 620 provides an example of the terminal device sending a wireless message to the base station using the communications resource specified by the grant signal. The step 630 provides an example of the base station sending acknowledgement information in respect of the wireless message.

As mentioned above, in a so-called coverage enhancement (CE) mode, in addition to the use of an aggregation level (AL), a repetition level (RL) can be used by which a message can be sent multiple consecutive times in order that, at reception of that message, the signal to noise ratio can be improved by an averaging or other combining process applied to the multiple instances of repetition of the message. The repetition can reduce the overall available data rate but can provide greater coverage by potentially allowing operation in respect of noisier received signals.

Figure 8:
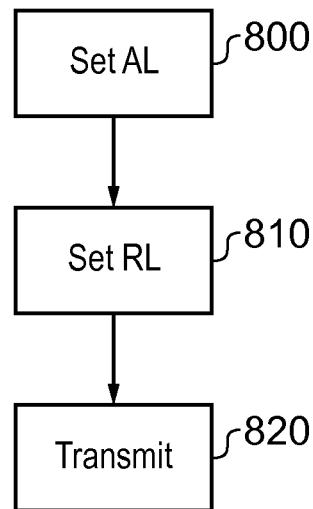
FIG. 8 is a schematic flowchart illustrating the use of aggregation levels and repetition levels.

FIG. 8 is a schematic flow chart illustrating the use of aggregation levels (AL) and repetition levels (RL). The aggregation level and repetition level are determined by the base station.

At a step 800, the base station sets an aggregation level. At a step 810 the base station sets a repetition level. At a step 820 the base station transmits a message using the specified aggregation level and repetition level.

Figure 9:
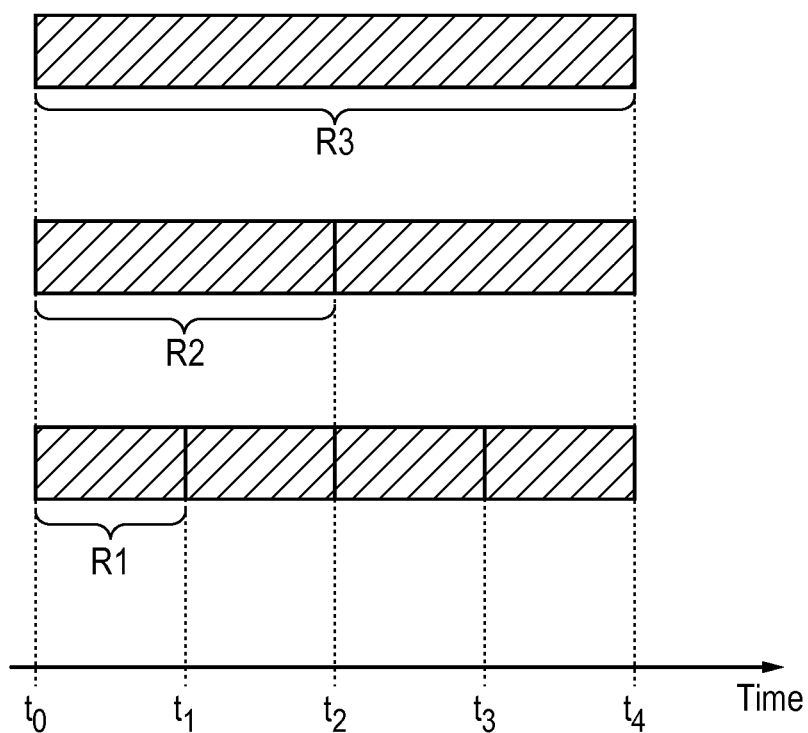
FIG. 9 is a schematic timing diagram illustrating repetition levels.

FIG. 9 is a schematic timing diagram illustrating repetition levels in which boundaries ($t_0$ . . . $t_4$) are illustrated between consecutive subframes. Three example repetition levels R1, R2 and R3 are shown. Data at a lower repetition level such as R1 can be sent in a shorter time period than data at a higher repetition level such as R3, meaning that in the course of one message transmission at repetition level R3, multiple different messages at R1 can be sent.

The use of repetition levels in the CE feature of LC-MTC terminal devices can tend to increase the power consumption required to accumulate the repetitive samples. For MPDCCH reception, additional processing and power consumption are required to perform blind decoding. Since each instance of repetition of a message, a respective HARQ response will be received and will require blind decoding, this would increase the power consumption of the LC-MTC terminal.

The present disclosure recognizes this problem and also recognizes that the scale of the blind decoding task can depend upon on the search space in which the UE has to undertake blind decoding in order to find the HARQ response which is relevant to the message just sent by that UE.

Example embodiments of the present disclosure provide techniques for producing the extent of this search space, in other words reducing the number of potential candidate MPDCCH candidates.

An MPDCCH candidate can comprise a single ECCE or can comprise multiple ECCEs. In the discussion which follows, a search space containing the HARQ ACK/NACK will be referred to as the HARQ search space. In embodiments in which MPDCCH are considered as control data elements and ECCE as sub-elements, each control data element comprises a group of one or more sub-elements; and the subset (reduced search area) of control data elements comprises at least two groups of sub-elements.

In example embodiments, the HARQ search space is defined as two or more (or, in some instances to be discussed below, one or more) MPDCCH candidates. As mentioned, an MPDCCH may be carried as a group of one or more ECCEs, with the group size depending upon the AL. So there exists a full set of MPDCCH candidates, for example 32 such groups ranging in size from one ECCE to the a number of ECCEs equal to the maximum AL (for example, 24. The full set of MPDCCH candidates contains all of the permissible permutations of ECCEs (and repetitions) which can be used to carry an MPDCCH. The full search space represents all of these groups or permutations.

A reduced search space provides a subset, being some but not all, of the full set of groups or permutations. For example, the subset could contain two groups (out of the example 32) or more than two, but fewer than 32, groups out of the example full set of 32.

The groups or permutations can be referenced by indices and the subsets defined by sub-groups of indices, for example a subset could comprise those groups of ECCEs having (say) group indices 1-4 out of a total range of group indices 1-32.

The embodiments just described define the reduced search space (the subset of the full available search space) by a subset of MPDCCH candidates (the groups or permutations of ECCEs). In other examples, the reduced search space could be defined by a reduced set of ECCEs, with any MPDCCH candidates which can be entirely carried by that reduced set of ECCEs being considered to be part of the reduced search space.

The HARQ search space can be specific to one terminal device or can be shared amongst (that is to say common between) multiple terminal devices. The HARQ search space is smaller in extent than the full available search space, which is to say that it represents a subset of all of the possible MPDCCH candidates which could be used to transmit the HARQ response.

Figure 10:
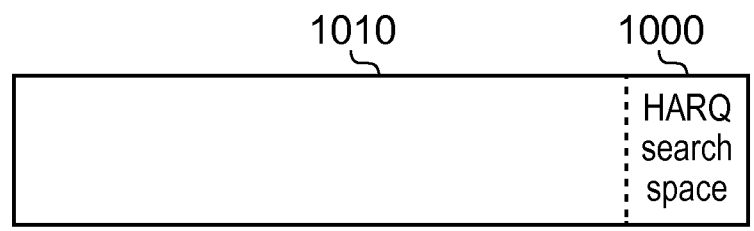
FIG. 10 schematically illustrates downlink control information (DCI)

FIG. 10 schematically illustrates an example of downlink control information (DCI) 1010 in which, amongst other content, an HARQ search space is encoded as a data field 1000. In other words, the grant signal provides a data field specifying the subset of control data elements. Note that the data field is shown at the end of the DCI purely for the purposes of the diagram. This does not represent a requirement for any particular position or configuration of the data field within the DCI. The DCI of FIG. 10 could be, for example, the DCI containing the uplink grant 700. This means that the terminal device receives information defining the HARQ search space in advance of having to undertake a search such as a blind decoding operation of that search space eight subframes later when the terminal device is detecting the HARQ response to its message.

The encoding of the HARQ search space as the field 1000 could be as a definition of a predetermined subset of MPDCCH candidates (for example, subset 1, subset 2 and so on), or as a list of specific MPDCCH candidates, or by other techniques.

Figure 11:
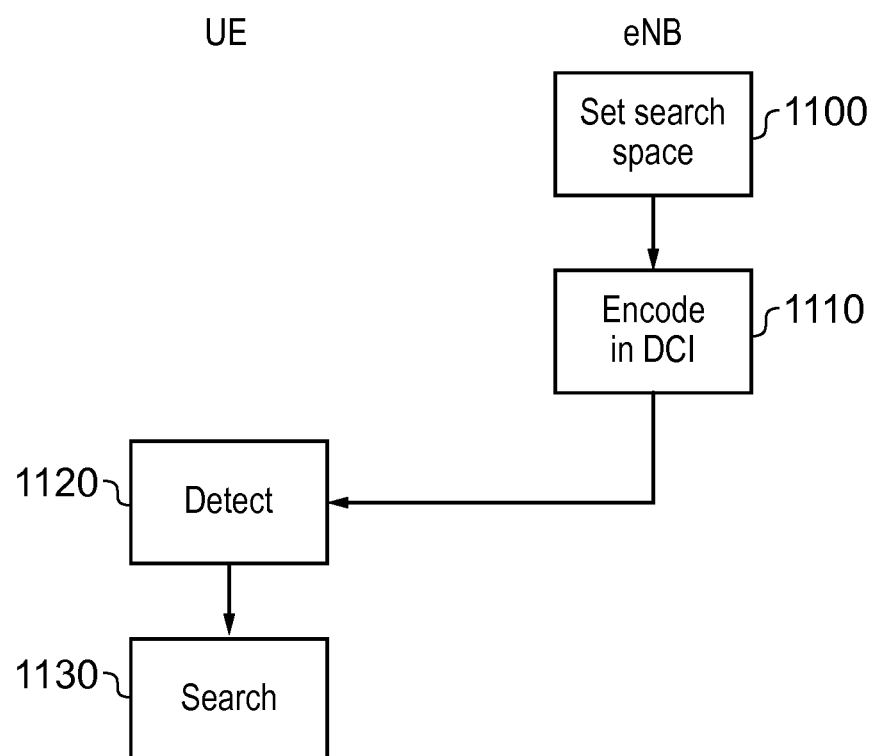
FIG. 11 is a schematic flowchart illustrating the encoding of a search space as part of DCI.

An example of this operation is shown schematically in FIG. 11, which is a schematic flow chart illustrating the encoding of a search space as part of downlink control information.

At a step 1100, the base station defines or determines a subset, being some but not all, of a set of controlled data elements (such as MPDCCH or ECCE) providing wireless signaling from the base station to the terminal device.

At a step 1110, the base station encodes and sends information defining the HARQ search space (the subset) as part of the DCI of FIG. 10, which is an example of the grant signal providing a data field specifying the subset of control data elements.

At a step 1120, the terminal device detects the DCI and from it, detects the subset of control data elements. (The terminal device also detects the uplink grant information and transmits a message to the base station using the resources indicated in the uplink grant information, but these steps are not shown in FIG. 11 for clarity of the diagram). This is an example of determining, in dependence upon the grant signal, a subset, being some but not all, of a set of control data elements providing wireless signalling from the base station to the terminal device.

Finally, when the scheduled subframe for HARQ response is reached, the terminal device undertakes a search at a step 1130 for the HARQ response, the search encompassing only the subset of control data elements, as an example of detecting, from a control data element in the subset, acknowledgement information sent by the base station in respect of the wireless message.

The arrangement described above therefore allows the LC-MTC terminal device to blind decode only a reduced set of candidate control data elements. Blind decoding the subset is an example of the controller being configured to decode control data elements of the subset of control data elements and to detect whether each decoded control data element contains acknowledgement information relating to the wireless message.

Another example embodiment will be described with reference to FIGS. 12 and 13. In this arrangement, the MPDCCH candidates are implicitly indicated by the ECCE of the MPDCCH that schedules the PUSCH transmission. In these examples the transceiver of the terminal device is configured to receive the grant signal by one or more of the control data elements; and the controller of the terminal device is configured to detect the subset in dependence upon which control data element or sub-element carried the grant signal, for example according to a mapping, specified by the base station, between the subset and a (or the) control data element or sub-element associated with the grant signal (for example, providing or carrying the grant signal).

Here, it is noted that the MPDCCH candidates comprise respective groups of one or more ECCEs. The ECCEs have a logical ordering, which in this example will be shown as running from ECCE01 . . . ECCE16. The ECCEs are transmitted by various means, but in one example arrangement each of four PRBs (Physical Resource Blocks) contains four ECCEs spread throughout that PRB. In this example, the sub-elements (ECCEs) have a logical ordering common to the terminal device and the base station; and each of control data elements (MPDCCH) comprises a contiguous group of sub-elements in the logical ordering.

As mentioned, an MPDCCH candidate comprises a group of one or more ECCEs. For example, an MPDCCH candidate may be ECCE01. At an aggregation level of 2, an ECCE candidate may be ECCE03 and ECCE04. At an aggregation level of 4, an MPDCCH candidate may be ECCE09 . . . ECCE12, and so on.

A relationship or mapping can be established between the characteristics (or a characteristic) of the MPDCCH candidate that is used to transmit the uplink grant message and a search space for a subset of MPDCCH candidates to be searched by the terminal device at the HARQ response stage. One such relationship is the AL of the MPDCCH candidate that is used to transmit the uplink grant. For example if the MPDCCH that is used to schedule the PUSCH has AL=4, then the subset of MPDCCH candidates for HARQ feedback are MPDCCH candidates with AL=4 (or AL≥4). Similarly the repetition level used by the MPDCCH candidate that carries the uplink grant to schedule the PUSCH can be used to implicitly indicate the Repetition Levels in the HARQ search space. Accordingly, in examples, the controller is configured to define the subset in dependence upon a repetition level and/or aggregation level is applicable to the control data element associated with the grant signal.

Another relationship or mapping using the characteristic of the MPDCCH that carries the uplink grant can be established, such as between the index of one of the ECCEs in the MPDCCH used to transmit the uplink grant message and a search space for a subset of MPDCCH candidates to be searched by the terminal device at the HARQ response stage.

Figure 12:
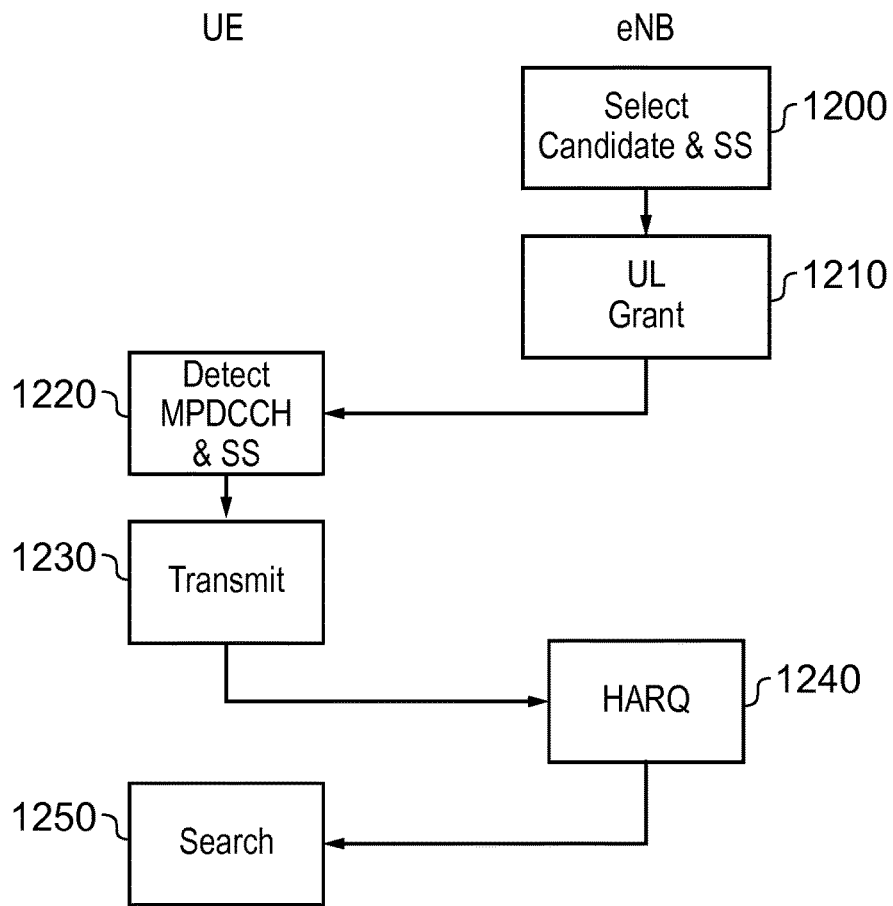
FIG. 12 is a schematic flowchart illustrating a process for detecting a search space from ECCE indices.
Figure 13:
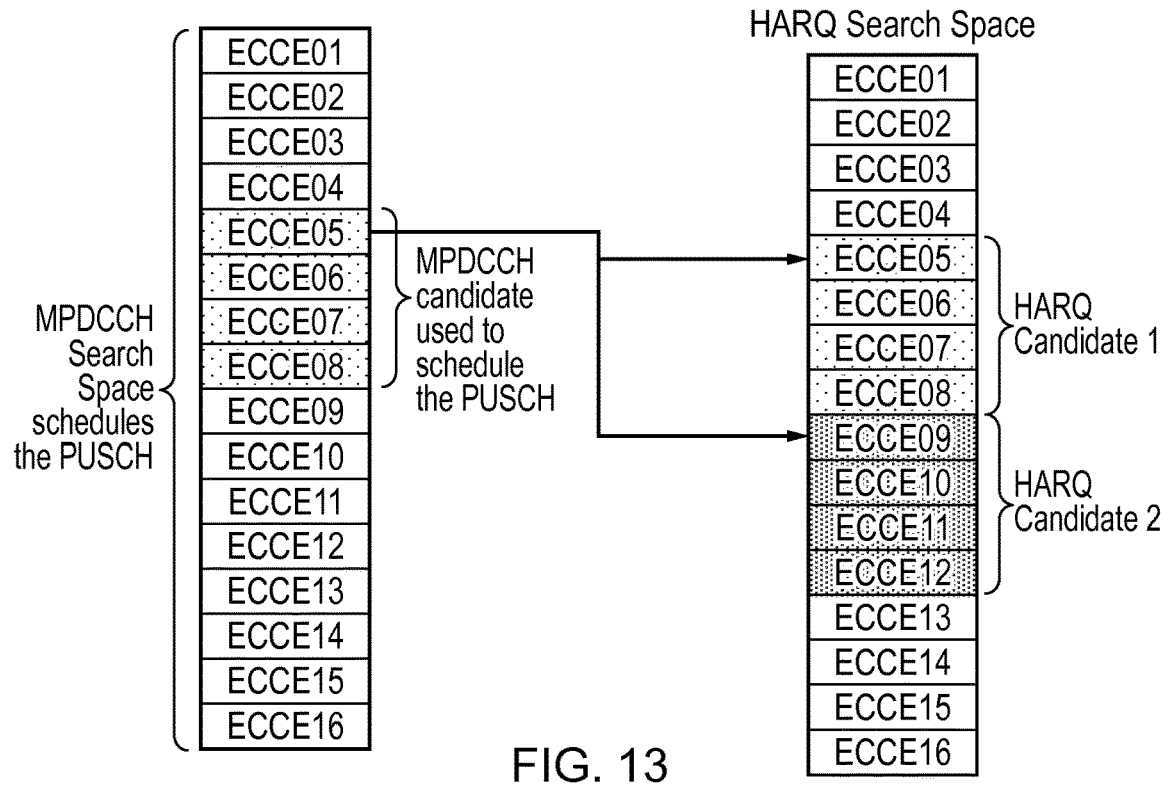
FIG. 13 is a schematic diagram illustrating an example of detecting a search space from ECCE indices.

Referring to FIGS. 12 and 13, at a step 1200, the base station selects an MPDCCH candidate for transmission of the uplink grant and also selects, determines or defines a search space (SS) for later use by the terminal device. Assume for now that a predetermined relationship is established (common to the base station and the terminal device) providing a predetermined mapping between the search space and the particular candidate MPDCCH selected at the step 1200.

At a step 1210, the base station transmits the uplink grant signal using the selected candidate MPDCCH.

At a step 1220, the terminal device detects the uplink grant sent as an MPDCCH and from this, obtains the uplink grant scheduling information to allow it to transmit a message at a step 1230. It also derives the search space for later use, from the mapping as applied to the MPDCCH used at the step 1210.

The base station transmits an HARQ response at a step 1240. To do this, the base station selects an MPDCCH candidate from those defined by the search space selected at the step 1200. At a step 1250 the terminal device carries out a search of the search space, or in other words the subset of MPDCCH candidates, defined at the step 1220 and in turn obtained from the identity of the candidate MPDCCH used to transmit the uplink grant. The terminal device detects the base station's HARQ response from the search of the search space.

In the example of FIG. 13, the MPDCCH that is used to transmit the uplink grant comprises ECCE05 . . . ECCE08 (which is to say, AL=4). A predetermined relationship is assumed between, for example, the first ECCE index which links to two or more MPDCCH candidates in the HARQ search space. In this example, the first ECCE index of the MPDCCH used for the uplink grant is ECCE05 and (again, in this example) this is associated by a predetermined mapping to two candidates of AL=4, namely {ECCE05 . . . ECCE08} and {ECCE09 . . . ECCE12}. The LC-MTC terminal device blind decodes amongst these two candidates in the HARQ search space for its HARQ space ACK/NACK at the step 1250.

Although this example makes use of a mapping based upon the first ECCE index amongst the MPDCCH used by the base station, other ECCE indices within the MPDCCH used by the base station can be used as the basis of the mapping, for example the highest (last) ECCE index of the MPDCCH used at the step 1210 by the base station.

In the example discussed above, the mapping between ECCE index and candidates in the HARQ search space was predetermined. In other examples, the mapping can be based upon a function or mapping table which is configurable, for example by the base station which can indicate, to a terminal device, which mapping to use within a predefined set of mappings. For example, the interpretation or use of the function or mapping table by the terminal device could be a function of the RNTI (Radio Network Temporary Identity) allocated by the base station to the terminal device during network registration. Different terminal devices can apply different mapping tables.

As discussed, the subset of control data elements comprises at least two groups of control data elements (in the example of FIG. 13, HARQ candidate 1 and HARQ candidate 2). The use of multiple candidates in the search space provides greater flexibility for the base station (compared to the use of just one candidate in the search space) in terms of scheduling the transmission of the HARQ response. This flexibility can be useful because the search space is specified at least some subframes in advance of when the HARQ response will be sent.

In another example embodiment, the MPDCCH candidates in the HARQ search space are implicitly indicated by the narrow band (the radio frequency band index) allocated to the terminal device to carry out the PUSCH transmission. Again, this can be by a predetermined mapping, a terminal device-specific mapping provided by the base station, a mapping dependent upon information such as the RNTI allocated to a terminal device and so on. Therefore, in these examples, the communications resource defined by the grant signal comprises a radio frequency band for use by the terminal device; and the controller of the terminal device is configured to detect the subset in dependence upon the radio frequency band specified by the grant signal.

Figure 14:
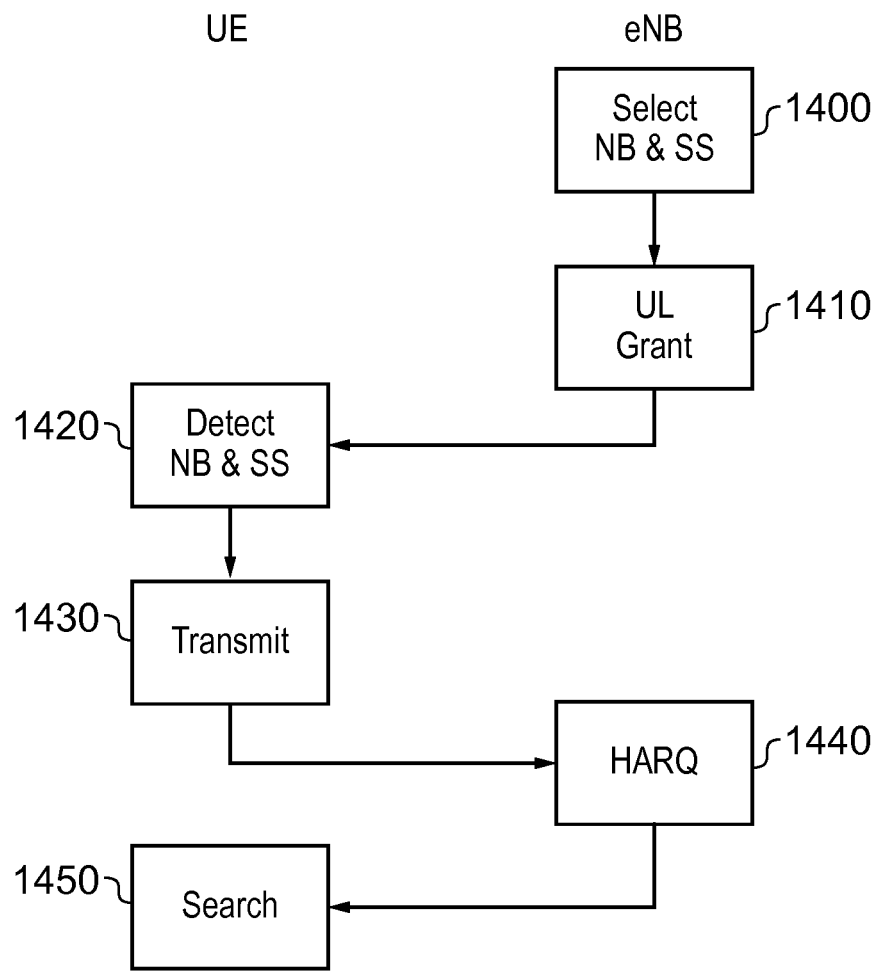
FIG. 14 is a schematic flowchart illustrating a process for detecting a search space from narrowband identities.

Referring to FIG. 14, at a step 1400 the base station selects a search space and, related to the search space, a narrowband (NB) for use by the terminal device in a scheduled transmission. The two are related by a mapping as discussed above. The base station can select a NB and then detect the mapped search space, or the base station can select a search space and then detect the mapped NB, or the base station can select a NB-search space pair. At a step 1410 the base station sends an uplink grant to the terminal device.

At a step 1420, the terminal device detects the allocated narrowband (which is then used by the terminal device for transmission of a message at a step 1430) and from the narrowband detects the search space using a mapping as discussed above.

At a step 1440, the base station transmits its HARQ response and, at a step 1450 the terminal device searches for the HARQ response amongst the subset of candidate MPDCCH defined by the search space.

As an alternative to the use of the narrowband, a PRB index within the selected narrowband (also specified as part of the uplink grant information) can be used as the (or as an additional) input to the mapping process discussed above.

Figure 15:
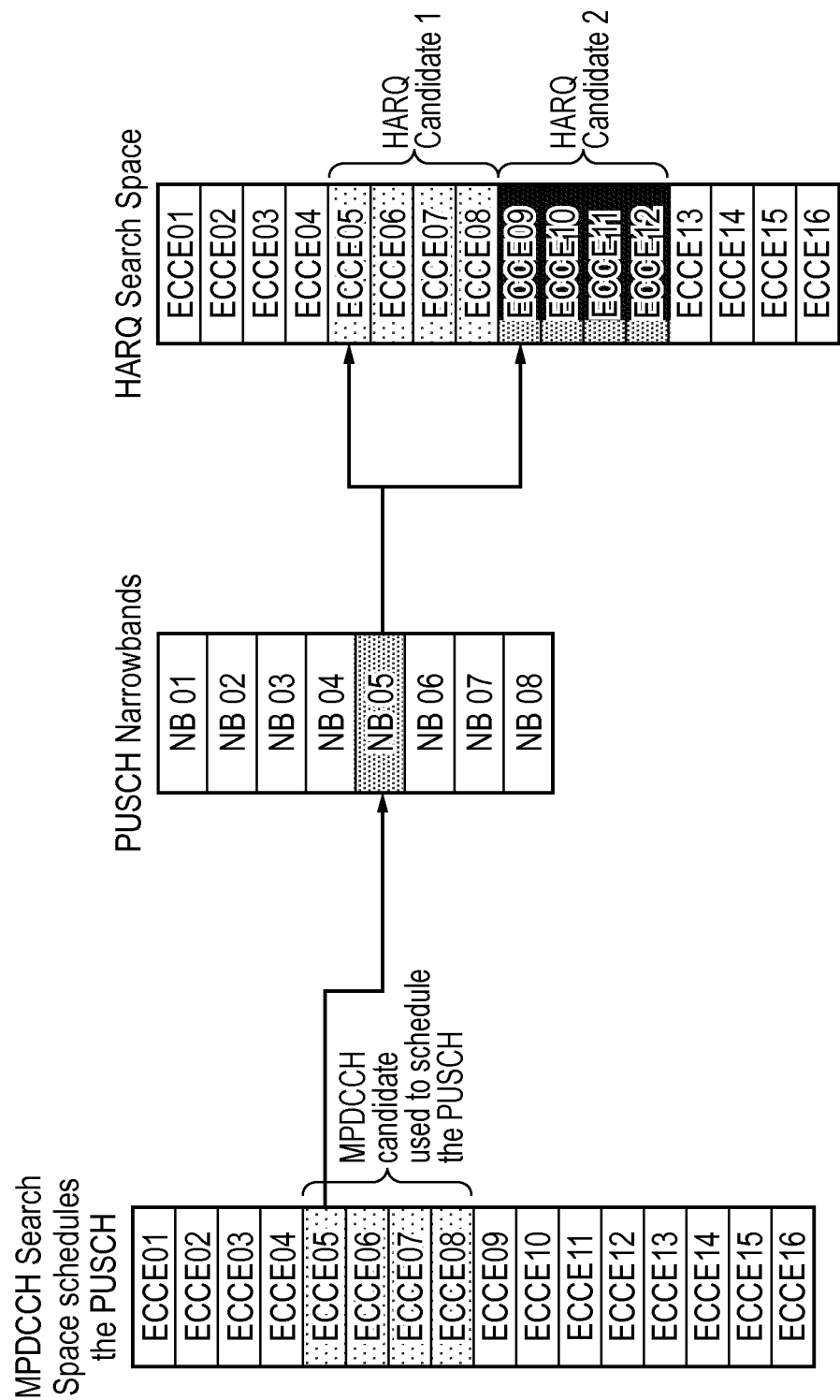
FIG. 15 is a schematic diagram illustrating an example of detecting a search space from narrowband identities.

In the example of FIG. 15, a narrowband of NB05 is allocated to the terminal device by the uplink grant at the step 1410. The mapping applied both at the step 1400 and at the step 1420 indicates two HARQ candidates (HARQ candidate 1, HARQ candidate 2) as shown to the right hand side of FIG. 15.

So far, the discussion has related to the number of MPDCCH candidates in the HARQ search space being at least two. However, in alternative embodiments, either the explicit (for example, FIG. 10) or implicit (for example, FIG. 12 . . . 15) indication of a HARQ search space can in fact point to a single MPDCCH candidate as forming the HARQ search space. However, as mentioned above, using multiple MPDCCH candidates can be beneficial for the base station scheduler. In instances where the number of MPDCCH candidates are two or more the terminal device can identify the actual MPDCCH candidate carrying the relevant HARQ acknowledgement by (for example):

(a) A cyclic redundancy code (CRC) in the DCI carrying the HARQ acknowledgement information being masked (combined) with the identification of the relevant terminal device such as the RNTI of that terminal device (so that in these examples the control data element carrying acknowledgement information relating to the wireless message is associated with error detection data combined with data identifying the terminal device; and the controller is configured to detect, from the data identifying the terminal device, which control data element carries acknowledgement information relating to the wireless message); and/or (b) An index or identifier attached to the HARQ acknowledgement identifying the relevant terminal device. The index or identification does not need to be the radio network temporary identity but could as an alternative be an index that is associated with the narrowband and/or PRB used for the transmission by the terminal device. Advantages of using a narrowband and/or PRB index are that they may be smaller in size than the radio network temporary identity (so that, in these examples, the acknowledgement information comprises data identifying the terminal device; and the controller is configured to detect, from the data identifying the terminal device, which control data element carries acknowledgement information relating to the wireless message.)

Figure 16:
FIG. 16 schematically illustrates DCI carrying HARQ information for multiple UEs.

FIG. 16 schematically illustrates an alternative arrangement in which a DCI 1600 carries HARQ information for multiple terminal devices. Here, "multiple" could mean two terminal devices or more than two terminal devices. In the example discussed, the respective HARQ responses are carried by different fields of the DCI. In such arrangements, two different types of DCI could be defined, one for acknowledging a single terminal device and another format for acknowledging multiple terminal devices (an example of the latter being shown in FIG. 16). In these examples the controller of the terminal device is configured to detect the acknowledgement information from a signalling transmission comprising multiple instances of such information relating to respective wireless messages. (Similarly a base station is configured to send such multiple instances).

These arrangements can, for example, be handled by assigning a group identifier as well as an individual identifier to a terminal device, such that the terminal device attempts to decode a DCI using both the individual and the group identifiers as part of the detection as to whether the DCI is intended for a signal terminal device or multiple terminal devices. For example, the group identifiers could be semi-static or dynamic.

For example, a terminal device could be assigned a semi-static group identifier by a radio resource control (RRC) configuration process. The terminal devices that belong to that group may be scheduled together. An example application of such an arrangement is these of so-called smart meters detecting utility usage in the same geographical area.

In another option, dynamic grouping may change from schedule period to scheduling period. For example, those terminal devices that are scheduled with PUSCH resources in a first set of uplink narrowbands may be assigned to a first group, and those terminal devices that are scheduled with PUSCH in a second, different, set of uplink narrowbands could be assigned to a different group.

But in general, for situations in which the DCI 1600 carries multiple HARQ responses for multiple respective terminal devices, a process will now be described to allow a terminal device to determine which field within the DCI contains the relevant HARQ acknowledgement or negative acknowledgement.

Figure 17:
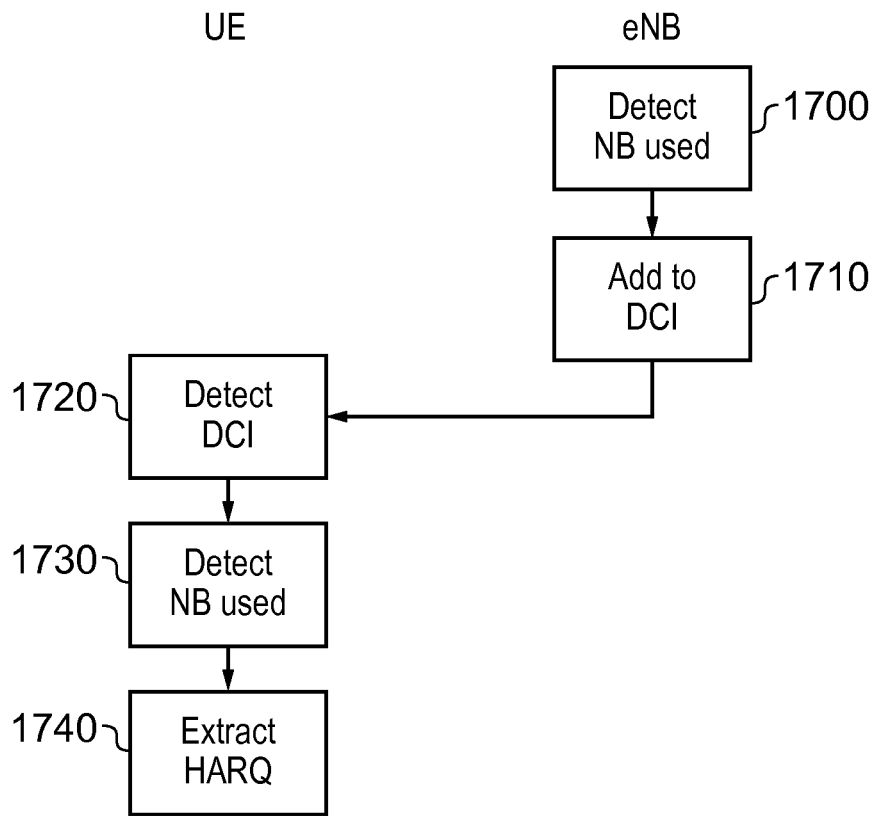
FIG. 17 is a schematic flowchart illustrating the use of DCI carrying HARQ information for multiple UEs.

FIG. 17 schematically illustrates one example arrangement, in which, at a step 1700, the base station determines which narrowband was allocated to, and used by, a particular terminal device in a PUSCH transmission (not shown in FIG. 17). Based on the this narrowband, the HARQ response is added (at a step 1710) to the DCI at a field within the DCI defined by a mapping with respect to the narrowband. For example, a fixed or adaptive or base-station specified mapping may be used between narrowband index and field index, with this mapping being held commonly between the base station and the terminal device.

At a step 1720, the terminal device detects the DCI and, at a step 1730, the terminal device detects which narrowband was allocated to and used for transmission by the terminal device (that is to say, the message transmission to which the expected HARQ response relates). Based on the mapping and the detected narrowband, the terminal device extracts the HARQ response from the relevant field of the DCI at a step 1740.

Figure 18:
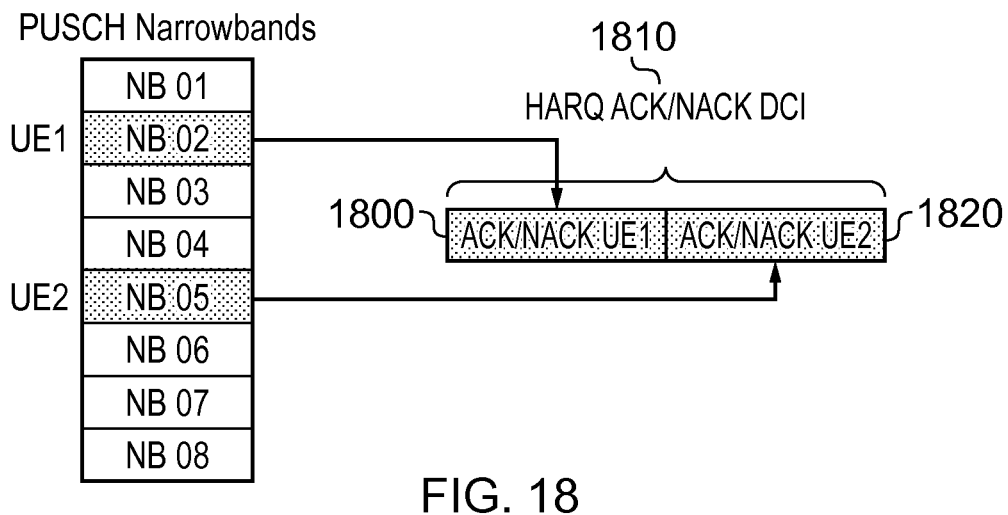
FIG. 18 is a schematic diagram illustrating an example of the use of DCI carrying HARQ information for multiple UEs.

FIG. 18 provides a schematic example of this arrangement in which a first terminal device (UE 1) used narrowband 02 pointing (via the mapping) to a first field 1800 in an HARQ DCI 1810. A different terminal device (UE 2) had been allocated (and used) narrowband 05 for its message transmission. According to the mapping, the HARQ information for that message is detected in a second field location 1820 in the DCI 1810.

Therefore, in these examples, the multiple instances have a logical ordering, the controller being configured to select an instance from the multiple instances according to a mapping between the instances and a radio frequency used for sending the wireless message, and to detect the acknowledgement information from the selected instance, or the controller is configured to select an instance from the multiple instances according to a mapping indicating an instance in the logical ordering associated with that terminal device, and to detect the acknowledgement information from the selected instance.

The base station of FIG. 4, when operated in accordance with the techniques discussed above, provides an example of a base station for use in a wireless telecommunications system, the base station comprising: a transceiver configured to perform wireless communication with a terminal device using a communications resource allocated to the terminal device by the base station; and a controller configured to: allocate the communications resource to the terminal device; control the transceiver to send a grant signal to the terminal device, the grant signal specifying the communications resource for use by the terminal device; control the transceiver to receive a wireless message from the terminal device using the communications resource specified by the grant signal; define, in dependence upon the grant signal, a subset, being some but not all, of a set of control data elements providing wireless signalling from the base station to the terminal device; and control the transceiver to send to the terminal device, using a control data element in the subset, acknowledgement information sent by the base station in respect of the wireless message.

The terminal device of FIG. 5, when operated in accordance with the techniques discussed above, provides an example of a terminal device for use in a wireless telecommunications system, the terminal device comprising: a transceiver configured to perform wireless communication with a base station using a communications resource allocated to the terminal device by the base station; and a controller configured to: control the transceiver to receive a grant signal from the base station, the grant signal specifying a communications resource for use by the terminal device; control the transceiver to send a wireless message to the base station using the communications resource specified by the grant signal; determine, in dependence upon the grant signal, a subset, being some but not all, of a set of control data elements providing wireless signalling from the base station to the terminal device; and detect, from a control data element in the subset, acknowledgement information sent by the base station in respect of the wireless message.

The operations of the terminal device and the base station as described may be carried out by the respective controller interacting with the transmitter and receiver (which collectively provide a respective transceiver). The functions may be performed (in examples) at least in part by computer software, such as computer software stored on a non-transitory machine-readable storage medium (such as a magnetic or optical disk) being run by (or used to control operations of) a computer.

Figure 19:
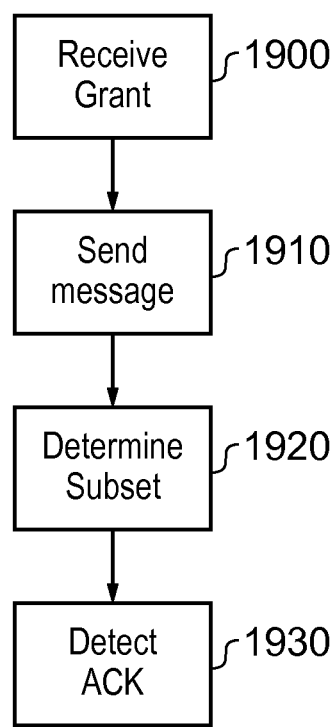
FIG. 19 is a schematic flowchart summarizing a method of operation of a UE.

FIG. 19 is a schematic flowchart summarizing a method of operation of a UE (as an example of a terminal device), the terminal device being configured to perform wireless communication with a base station using a communications resource allocated to the terminal device by the base station, the method comprising:

wirelessly receiving (at a step 1900) a grant signal from the base station, the grant signal specifying a communications resource for use by the terminal device;

sending (at a step 1910) a wireless message to the base station using the communications resource specified by the grant signal;

determining (at a step 1920), in dependence upon the grant signal, a subset, being some but not all, of a set of control data elements providing wireless signalling from the base station to the terminal device; and detecting (at a step 1930), from a control data element in the subset, acknowledgement information sent by the base station in respect of the wireless message.

Figure 20:
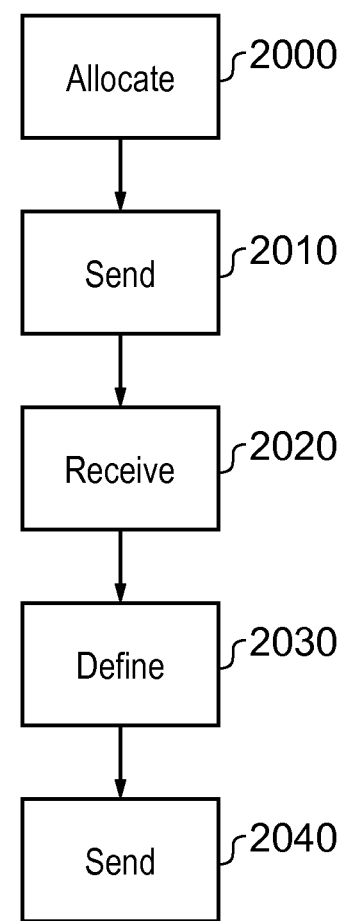
FIG. 20 is a schematic diagram summarizing a method of operation of a base station.

FIG. 20 is a schematic diagram summarizing a method of operation of a base station for use in a wireless telecommunications system, the base station being configured to perform wireless communication with a terminal device using a communications resource allocated to the terminal device by the base station; the method comprising:

allocating (at a step 2000) the communications resource to the terminal device;

wirelessly sending (at a step 2010) a grant signal to the terminal device, the grant signal specifying the communications resource for use by the terminal device;

receiving (at a step 2020) a wireless message from the terminal device using the communications resource specified by the grant signal;

defining or determining (at a step 2030), in dependence upon the grant signal, a subset, being some but not all, of a set of control data elements providing wireless signalling from the base station to the terminal device; and wirelessly sending (at a step 2040) to the terminal device, using a control data element in the subset, acknowledgement information sent by the base station in respect of the wireless message.

Where methods of processing, coding or decoding are discussed above, it will be appreciated that apparatus configured to perform such methods are also considered to represent embodiments of the disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

Respective aspects and features of embodiments of the disclosure are defined by the following numbered clauses:

1. A terminal device for use in a wireless telecommunications system, the terminal device comprising:
   a transceiver configured to perform wireless communication with a base station using a communications resource allocated to the terminal device by the base station; and
   a controller configured to:
   control the transceiver to receive a grant signal from the base station, the grant signal specifying a communications resource for use by the terminal device;
   control the transceiver to send a wireless message to the base station using the communications resource specified by the grant signal;
   determine, in dependence upon the grant signal, a subset, being some but not all, of a set of control data elements providing wireless signalling from the base station to the terminal device; and
   detect, from a control data element in the subset, acknowledgement information sent by the base station in respect of the wireless message.

2. A terminal device according to clause 1, in which the controller is configured to decode control data elements of the subset of control data elements and to detect whether each decoded control data element contains acknowledgement information relating to the wireless message.

3. A terminal device according to clause 2, in which:
   each control data element comprises a group of one or more sub-elements; and
   the subset of control data elements comprises at least two groups of sub-elements.

4. A terminal device according to clause 3, in which:
   the sub-elements have a logical ordering common to the terminal device and the base station; and
   each of control data elements comprises a contiguous group of sub-elements in the logical ordering.

5. A terminal device according to any one of the preceding clauses, in which the communications resource defined by the grant signal comprises one or both of a radio frequency band and a transmission time slot.

6. A terminal device according to any one of the preceding clauses, in which the grant signal provides a data field specifying the subset of control data elements.

7. A terminal device according to any one of the preceding clauses, in which:
   the transceiver is configured to receive the grant signal by one or more of the control data elements;
   the controller is configured to detect the subset in dependence upon a control data element or sub-element associated with the grant signal.

8. A terminal device according to clause 7, in which the control device is configured to detect the subset according to a mapping, specified by the base station, between the subset and a control data element or sub-element associated with the grant signal.

9. A terminal device according to any one of clauses 1 to 6, in which:
   the transceiver is configured to receive the grant signal by one or more of the control data elements;
   the controller is configured to determine the subset in dependence upon a repetition level and/or aggregation level applicable to the one or more of the control data elements associated with the grant signal.

10. A terminal device according to clause 5, in which:
    the communications resource defined by the grant signal comprises a radio frequency band for use by the terminal device; and
    the controller is configured to detect the subset in dependence upon the radio frequency band specified by the grant signal.

11. A terminal device according to clause 3, in which:
    the control data element carrying acknowledgement information relating to the wireless message is associated with error detection data combined with data identifying the terminal device;
    the controller is configured to detect, from the data identifying the terminal device, which control data element carries acknowledgement information relating to the wireless message.

12. A terminal device according to clause 3, in which:
    the acknowledgement information comprises data identifying the terminal device; and
    the controller is configured to detect, from the data identifying the terminal device, which control data element carries acknowledgement information relating to the wireless message.

13. A terminal device according to according to any one of the preceding clauses, in which the controller is configured to detect the acknowledgement information from a signalling transmission comprising multiple instances of such information relating to respective wireless messages.

14. A terminal device according to clause 13, in which the multiple instances have a logical ordering, the controller being configured to select an instance from the multiple instances according to a mapping between the instances and a radio frequency used for sending the wireless message, and to detect the acknowledgement information from the selected instance.

15. A terminal device according to clause 13, in which the multiple instances have a logical ordering, the controller being configured to select an instance from the multiple instances according to a mapping indicating an instance in the logical ordering associated with that terminal device, and to detect the acknowledgement information from the selected instance.

16. A base station for use in a wireless telecommunications system, the base station comprising:
    a transceiver configured to perform wireless communication with a terminal device using a communications resource allocated to the terminal device by the base station; and
    a controller configured to:
    allocate the communications resource to the terminal device;
    control the transceiver to send a grant signal to the terminal device, the grant signal specifying the communications resource for use by the terminal device;
    control the transceiver to receive a wireless message from the terminal device using the communications resource specified by the grant signal;
    define, in dependence upon the grant signal, a subset, being some but not all, of a set of control data elements providing wireless signalling from the base station to the terminal device; and
    control the transceiver to send to the terminal device, using a control data element in the subset, acknowledgement information sent by the base station in respect of the wireless message.

17. A base station according to clause 16, in which:
    each control data element comprises a group of one or more sub-elements; and
    the subset of control data elements comprises at least two groups of sub-elements.

18. A base station according to clause 17, in which:
the sub-elements have a logical ordering common to the terminal device and the base station; and
each of the groups of sub-elements is a contiguous group of sub-elements in the logical ordering.

19. A base station according to any one of clauses 16 to 19, in which the communications resource defined by the grant signal comprises one or both of a radio frequency band and a transmission time slot.

20. A base station according to any one of clauses 16 to 19, in which the grant signal provides a data field specifying the subset of control data elements.

21. A base station according to any one of clauses 16 to 20, in which:
the transceiver is configured to send the grant signal by a control data element;
the controller is configured to define the subset in dependence upon a control data element associated with the grant signal.

22. A base station according to clause 21, in which the control device is configured to define the subset according to a mapping, specified by the base station, between the subset and a control data element associated with the grant signal.

23. A terminal device according to claim 16, in which:
the transceiver is configured to send the grant signal by a control data element;
the controller is configured to define the subset in dependence upon a repetition level and/or aggregation level applicable to the control data element associated with the grant signal.

24. A base station according to clause 19, in which:
the communications resource defined by the grant signal comprises a radio frequency band for use by the terminal device; and
the controller is configured to define the subset in dependence upon the radio frequency band specified by the grant signal.

25. A base station according to clause 17, in which:
the controller is configured to associate, with a control data element carrying acknowledgement information, error detection data combined with data identifying the terminal device.

26. A base station according to clause 17, in which:
the acknowledgement information comprises data identifying the terminal device.

27. A base station according to any one of clauses 16 to 26, in which the controller is configured to control the transceiver to send the acknowledgement information within a signalling transmission comprising multiple instances of such information relating to respective wireless messages.

28. A base station according to clause 27, in which the multiple instances have a logical ordering, the controller being configured to select an instance from the multiple instances according to a mapping between the instances and a radio frequency used by the terminal device for sending the wireless message.

29. A base station according to clause 27, in which the multiple instances have a logical ordering, the controller being configured to select an instance from the multiple instances according to a mapping indicating an instance in the logical ordering associated with that terminal device.

30. A wireless telecommunications system comprising a terminal device according to any one of clauses 1 to 15 and a base station according to any one of clauses 16 to 29.

31. A method of operating a terminal device for use in a wireless telecommunications system, the terminal device being configured to perform wireless communication with a base station using a communications resource allocated to the terminal device by the base station, the method comprising:
wirelessly receiving a grant signal from the base station, the grant signal specifying a communications resource for use by the terminal device;
sending a wireless message to the base station using the communications resource specified by the grant signal;
determining, in dependence upon the grant signal, a subset, being some but not all, of a set of control data elements providing wireless signalling from the base station to the terminal device; and
detecting, from a control data element in the subset, acknowledgement information sent by the base station in respect of the wireless message.

32. Computer software which, when executed by a computer, causes the computer to perform the method of clause 31.

33. A storage medium which stores computer software according to clause 32.

34. A method of operation of a base station for use in a wireless telecommunications system, the base station being configured to perform wireless communication with a terminal device using a communications resource allocated to the terminal device by the base station; the method comprising:
allocating the communications resource to the terminal device;
wirelessly sending a grant signal to the terminal device, the grant signal specifying the communications resource for use by the terminal device;
receiving a wireless message from the terminal device using the communications resource specified by the grant signal;
defining, in dependence upon the grant signal, a subset, being some but not all, of a set of control data elements providing wireless signalling from the base station to the terminal device; and
wirelessly sending to the terminal device, using a control data element in the subset, acknowledgement information sent by the base station in respect of the wireless message.

35. Computer software which, when executed by a computer, causes the computer to perform the method of clause 34.

36. A storage medium which stores computer software according to clause 35.

The invention claimed is:
1. A terminal device for use in a wireless telecommunications system, the terminal device comprising:
a transceiver configured to perform wireless communication with a base station using a communications resource allocated to the terminal device by the base station; and
a controller configured to:
control the transceiver to receive a grant signal from the base station, the grant signal specifying a communications resource for use by the terminal device, wherein the communications resource defined by the grant signal comprises both of a radio frequency band and a transmission time slot;
control the transceiver to send a wireless message to the base station using the communications resource specified by the grant signal;
determine, based on the grant signal, a subset, being some but not all, of a set of control data elements providing wireless signalling from the base station to the terminal device;

detect the subset based on the radio frequency band specified by the grant signal; and detect, from a control data element in the subset, acknowledgement information sent by the base station with respect to the wireless message, wherein the transceiver is configured to receive the grant signal by one or more of the control data elements, wherein the controller is configured to detect the subset based on a control data element or sub-element associated with the grant signal, and configured to determine the subset according to a mapping table, specified by the base station, between the subset and the control data element or sub-element associated with grant signal.

2. A terminal device according to claim 1, in which the controller is configured to decode control data elements of the subset of control data elements and to detect whether each decoded control data element contains acknowledgement information relating to the wireless message.

3. A terminal device according to claim 2, in which:
each control data element comprises a group of one or more sub-elements; and
the subset of control data elements comprises at least two groups of sub-elements.

4. A terminal device according to claim 3, in which:
the sub-elements have a logical ordering common to the terminal device and the base station; and
each of control data elements comprises a contiguous group of sub-elements in the logical ordering.

5. A terminal device according to claim 1, in which the grant signal provides a data field specifying the subset of control data elements.

6. A terminal device according to claim 1, in which:
the controller is configured to determine the subset based on a repetition level and/or aggregation level applicable to the one or more of the control data elements associated with the grant signal.

7. A terminal device according to claim 3, in which:
the control data element carrying acknowledgement information relating to the wireless message is associated with error detection data combined with data identifying the terminal device;
the controller is configured to detect, from the data identifying the terminal device, which control data element carries acknowledgement information relating to the wireless message.

8. A terminal device according to claim 3, in which:
the acknowledgement information comprises data identifying the terminal device; and
the controller is configured to detect, from the data identifying the terminal device, which control data element carries acknowledgement information relating to the wireless message.

9. A terminal device according to claim 1, in which the controller is configured to detect the acknowledgement information from a signalling transmission comprising multiple instances of such information relating to respective wireless messages.

10. A terminal device according to claim 9, in which the multiple instances have a logical ordering, the controller being configured to select an instance from the multiple instances according to a mapping between the instances and a radio frequency used for sending the wireless message, and to detect the acknowledgement information from the selected instance.

11. A terminal device according to claim 9, in which the multiple instances have a logical ordering, the controller being configured to select an instance from the multiple instances according to a mapping indicating an instance in the logical ordering associated with that terminal device, and to detect the acknowledgement information from the selected instance.

12. A terminal device according to claim 1, in which:
the controller is configured to determine the subset based on a repetition level and aggregation level applicable to the one or more of the control data elements associated with the grant signal.

13. A base station for use in a wireless telecommunications system, the base station comprising:
a transceiver configured to perform wireless communication with a terminal device using a communications resource allocated to the terminal device by the base station; and
a controller configured to:
allocate the communications resource to the terminal device;
control the transceiver to send a grant signal to the terminal device, the grant signal specifying the communications resource for use by the terminal device, wherein the communications resource defined by the grant signal comprises both of a radio frequency band and a transmission time slot;
control the transceiver to receive a wireless message from the terminal device using the communications resource specified by the grant signal;
define, in dependence upon the grant signal, a subset, being some but not all, of a set of control data elements providing wireless signalling from the base station to the terminal device, wherein the subset is based on the radio frequency band specified by the grant signal; and
control the transceiver to send to the terminal device, using a control data element in the defined subset, acknowledgement information sent by the base station with respect to the wireless message,
wherein the transceiver is configured to send the grant signal by one or more of the control data elements, and the subset is detected based on a control data element or sub-element associated with the grant signal, and the terminal device is configured to determine the subset according to a mapping table, specified by the base station, between the subset and the control data element or sub-element associated with the grant signal.

14. A base station according to claim 13, in which:
each control data element comprises a group of one or more sub-elements; and
the subset of control data elements comprises at least two groups of sub-elements.

15. A base station according to claim 14, in which:
the sub-elements have a logical ordering common to the terminal device and the base station; and
each of the groups of sub-elements is a contiguous group of sub-elements in the logical ordering.

16. A method of operating a terminal device for use in a wireless telecommunications system, the terminal device being configured to perform wireless communication with a base station using a communications resource allocated to the terminal device by the base station, the method comprising:
wirelessly receiving a grant signal from the base station, the grant signal specifying a communications resource for use by the terminal device, wherein the communications resource defined by the grant signal comprises both of a radio frequency band and a transmission time slot;

sending a wireless message to the base station using the communications resource specified by the grant signal;

determining, in dependence upon the grant signal, a subset, being some but not all, of a set of control data elements providing wireless signalling from the base station to the terminal device;

detecting the subset based on the radio frequency band specified by the grant signal;

detecting, from a control data element in the subset, acknowledgement information sent by the base station with respect to the wireless message;

receiving the grant signal by one or more of the control data elements;

detecting the subset based on a control data element or sub-element associated with the grant signal; and determining the subset according to a mapping table, specified by the base station, between the subset and the control data element or sub-element associated with the grant signal.

\* \* \* \* \*